Feb. 4, 1936.   R. J. LEWIS   2,029,431
PORTABLE CONTAINER
Filed June 10, 1933   2 Sheets-Sheet 1

INVENTOR.
Robert J. Lewis
BY Chapman Ferguson
ATTORNEY.

Feb. 4, 1936. R. J. LEWIS 2,029,431
PORTABLE CONTAINER
Filed June 10, 1933 2 Sheets-Sheet 2

INVENTOR.
Robert J. Lewis
BY Chapin A. Ferguson
ATTORNEY.

Patented Feb. 4, 1936

2,029,431

UNITED STATES PATENT OFFICE 2,029,431

PORTABLE CONTAINER

Robert J. Lewis, Baltimore, Md.

Application June 10, 1933, Serial No. 675,262

1 Claim. (Cl. 280—3)

This invention relates to an improved portable container equipped with mechanism for moving it about on platforms, floors or other places and is especially adapted to be carried upon a motor truck body or railway car, either singly or in numbers. My invention is especially adapted for use in connection with a motor truck embodying patentable features set forth in an application filed by me on June 23rd, 1933, Serial No. 677,293, for Motor trucks.

The invention consists of the novel construction and arrangement of the parts and combination of parts hereinafter more fully set forth in the following specification and pointed out in detail in the appended claim.

In the accompanying drawings,—

Figure 1:
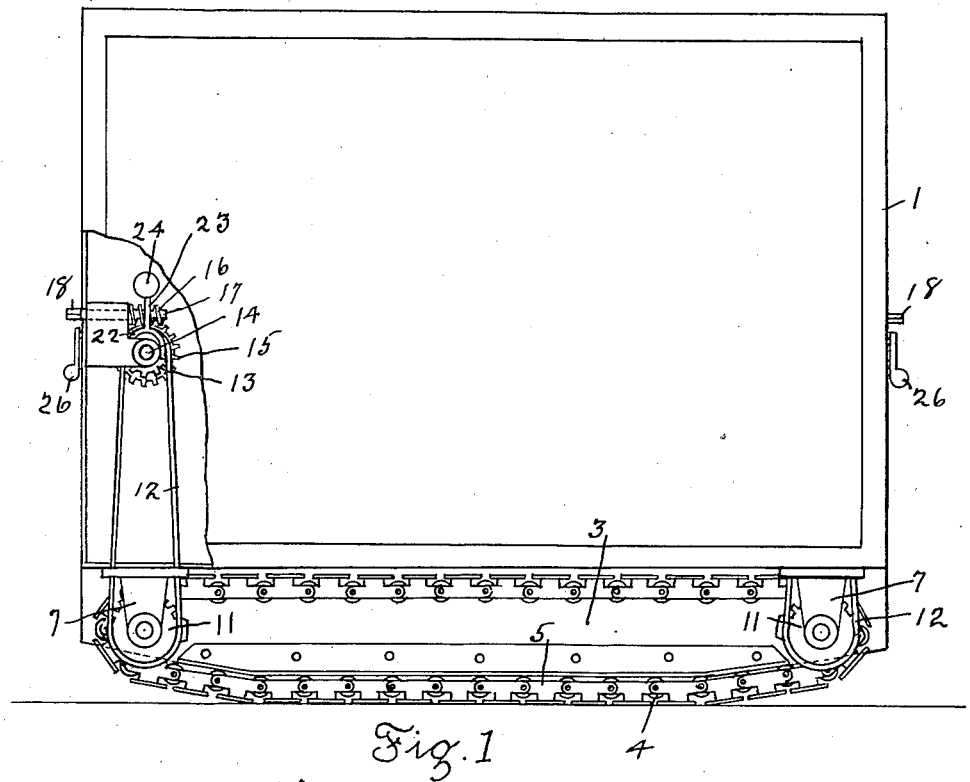
Figure 1 is an end view of my improved container partly broken away at one corner.
Figures 2, 3:
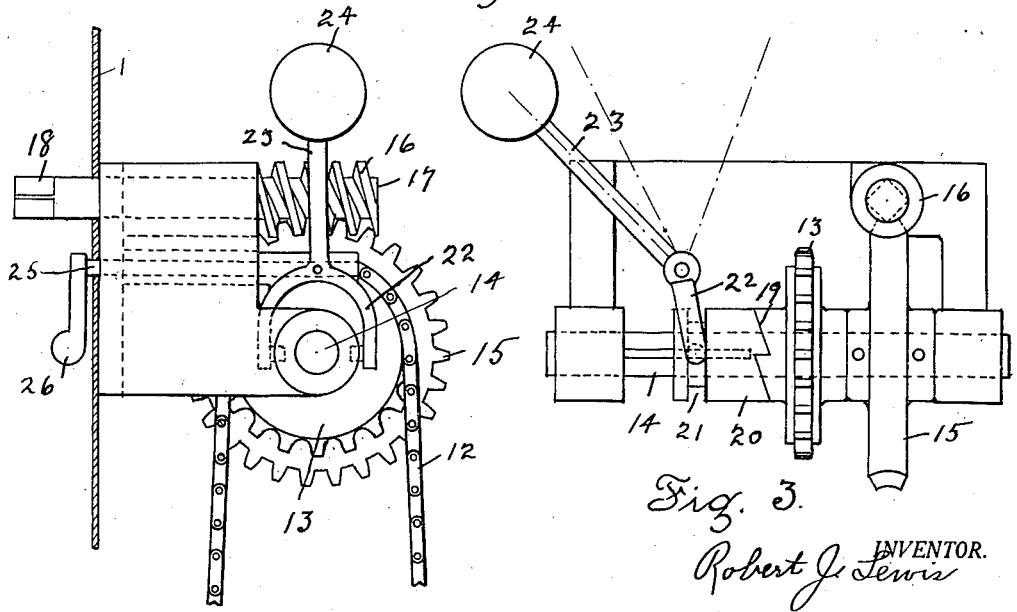
Figure 2 is an enlarged detail view of one of the crank shafts and clutch mechanism.
Figure 3 is a side view of Figure 2.
Figure 4:
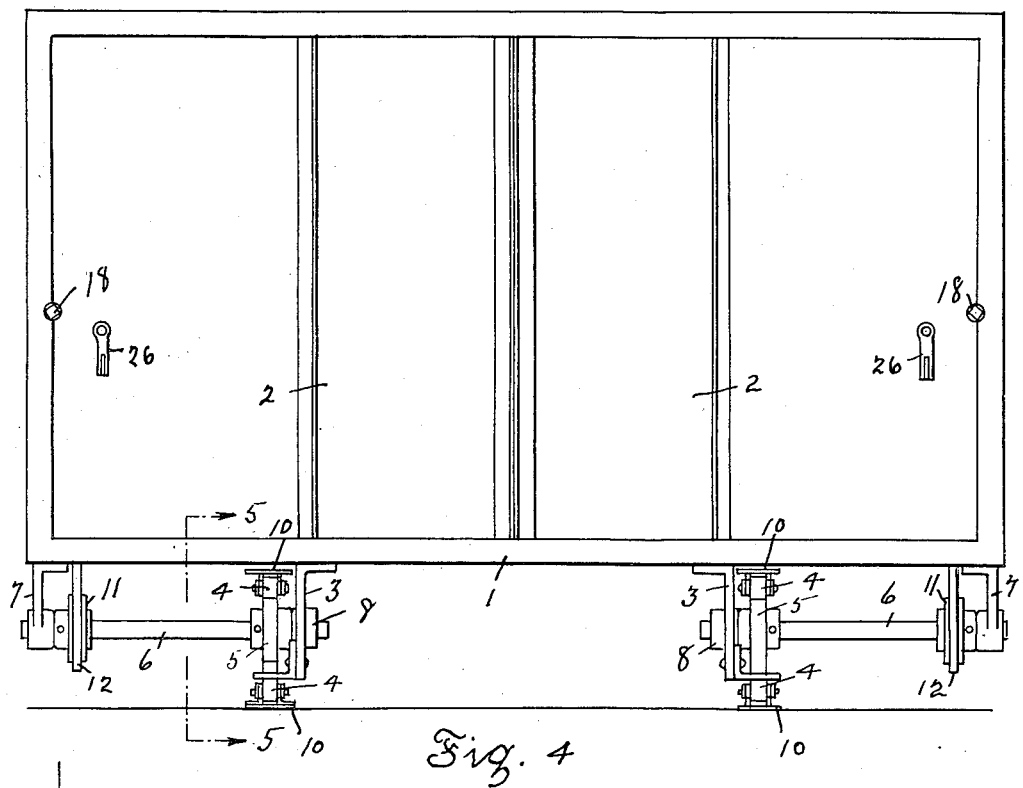
Figure 4 is a side view of Figure 1.
Figure 5:
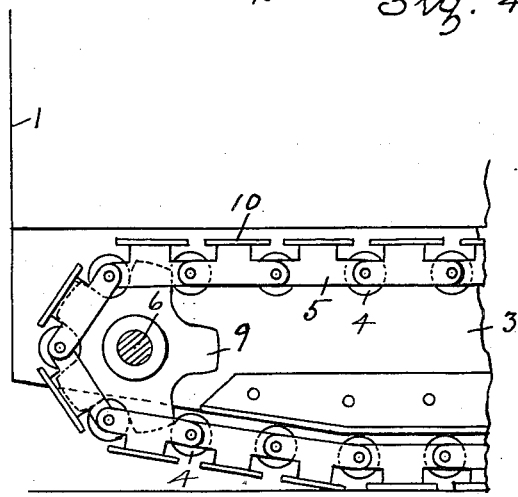
Figure 5 is an enlarged detail section of one end of the chain upon which the container travels, taken on the line 5—5 of Figure 4.
Figure 6:
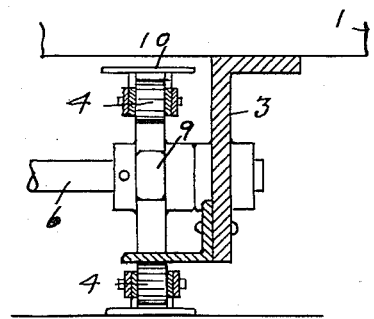
Figure 6 is an end view of Figure 5.

Referring to the accompanying drawings, forming part of this application, and in which like reference numerals designate like parts throughout the several views thereof, I designates the body of the carrier, which is provided on one or both sides with sliding doors 2. The said body I is mounted on two angle irons 3, the lower angles of which rest upon the rollers 4 of the chain 5. At each end of the body I, and on the under surface thereof, is a shaft 6 mounted in the bearings 7 and 8. On each of the four shafts 6 near the angle iron 3 is rigidly fixed a spur wheel 9 for revolving the chain 5 which latter is formed of a number of links each having a flat foot 10 projecting outwardly therefrom, and a roller 4 pivoted therebetween. On the ends of the shafts 6 near the bearing 7 is a sprocket wheel 11 rigidly fixed to said shaft 6 and revoluble therewith. A sprocket chain 12 connects each of said sprocket wheels 11 with the sprocket wheels 13 loosely mounted on the shaft 14. A worm wheel 15 is rigidly fixed to each of the shafts 14 and is in mesh with the worm 16 on the crank shaft 17, the latter being provided with a square head 18 on its outer end for the reception of a crank handle. The sprocket wheels 13 are each provided with teeth 19 on one side adapted to mesh the teeth on the clutch 20. The said clutch 20 is splined to the shaft 14 and is always revoluble therewith and is slidable lengthwise on said shaft. The said clutch is provided with an annular recess 21 into which the ends of the yoke 22 project. The said yoke 22 is provided with an arm 23 extending therefrom and provided on its outer end with a weight 24. The said weight 24 serves to hold the clutch 20 in or out of contact with the teeth of the sprocket wheel 13. When the clutch 20 is in engagement with the teeth on the sprocket wheels 13 the shaft 14 will be revolved with said sprocket wheels. The yoke 22 has a rod 25 extending through the outside of the body I and has a lever 26 on its outer end by means of which the yoke is thrown to cause the clutch to engage or disengage the sprocket wheels 13 as indicated by dot and dash lines in Figure 3. There are four of the yokes 22 and operating parts therefor.

When it is desired to move the body I along the floor or platform crank handles are placed on two of the crank shafts 17 on one side of the body and turned whereby through the medium of the chains 12 and sprocket wheels 11 cause the shafts 6 on that side to revolve which in turn causes the spur wheels 9 to revolve the chains 5 causing the body I to roll along on the rollers 4. The chains 12 on the opposite side of the body I will also revolve, causing the shafts 14 on that side to revolve in the reverse direction and as the sprocket wheels 13 are loosely mounted on the shafts 14 the clutch teeth 19 will simply force the clutch 20 along the shaft and not cause the shafts 14 to revolve. When the shafts 14 on one side of the body I are being operated the shafts 14 on the opposite side will not be turned. When it is desired to throw the clutch 20 out of operation the lever 26 is turned until the weight 24 is thrown over to the opposite side as indicated in dotted lines in Figure 3. If it is desired to move the body I in the opposite direction the crank handle is placed on the crank shafts on the opposite side of the body I and the same operation is repeated.

The body I is loaded through the sliding doors 2.

Having thus described my invention, what I claim is:

A portable container comprising a body having doors in the side thereof, a shaft mounted at each corner of the body on the under surface thereof, a spur wheel rigidly secured to each of said shafts, a chain at each end of the body, said chains connecting two shafts running parallel to the sides of the body, rollers carried by said chain and upon which the body travels, a sprocket wheel rigidly fixed to each of said shafts, two shafts mounted on each side of the body near the end and above the shafts on the under surface of the body, sprocket wheels loosely mounted on the last named shafts and each having teeth on one side thereof, a clutch splined on each of said last named shafts and each having teeth on one side thereof adapted to co-operate with the teeth of the loosely mounted sprocket wheels, means for throwing the clutch in and out of contact with said loosely mounted sprocket wheels, chains connecting the rigidly fixed sprocket wheels with the loosely mounted sprocket wheels, a worm wheel rigidly fixed to each of said last named shafts, crank shafts each having a worm thereon to mesh with one of the worm wheels, and means for turning said crank shafts.

ROBERT J. LEWIS.